Figure 1:
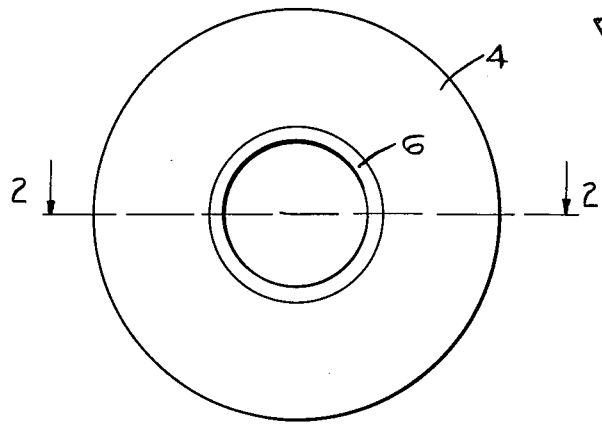

June 13, 1961     K. C. NICHOLSON     2,987,874
CERAMIC LINED, LIGHT WEIGHT ROCKET MOTOR
NOZZLES AND LIKE DEVICES
Filed March 15, 1954

*INVENTOR.*
KENNETH C. NICHOLSON
BY
ATTORNEY

United States Patent Office 2,987,874
Patented June 13, 1961

2,987,874
CERAMIC LINED, LIGHT WEIGHT ROCKET MOTOR NOZZLES AND LIKE DEVICES
Kenneth C. Nicholson, Niagara Falls, N.Y., assignor to The Carborundum Company, Niagara Falls, N.Y., a corporation of Delaware
Filed Mar. 15, 1954, Ser. No. 416,012
8 Claims. (Cl. 60—35.6)

This invention relates to devices for the directional release of hot gases of combustion, as for example, rocket motor and recoilless rifle nozzles, where the combustion gases are released at extremely high temperatures and velocities through a discharge port or orifice of restricted cross-section.

Rocket motor structures are not new, the art disclosing such devices as being used over twenty-five years ago. However, despite the fact that the principles upon which rockets and the like are based are relatively old, it has been only recently that any measure of success has been achieved in the design of such structures. One of the prime reasons for this delay in the design of successful rocket motor structures has been the inability to provide parts of the structures which are exposed to the highly corrosive and erosive hot gases of combustion which are capable of standing up under these exacting conditions of use for any substantial period of time.

In the past this design problem has been overcome to some extent by the provision of metal lining elements for the rocket nozzle and means for fluid cooling the linings. However, fluid cooling means for metal lined rocket nozzles has the disadvantage of being extremely costly, inasmuch as such means is inherently intricate, and the further disadvantage of adding unduly to the weight of the structures, which is a prime consideration in airborne devices.

A more promising line of investigation to develop rocket nozzles having satisfactory firing lives appeared to be in the development of non-metallic refractory linings for the rocket motor nozzle and other parts which are exposed to the combustion gases. Satisfactory rocket linings must be able to withstand the extremely high temperatures of the hot combustion gases. Also, they must be highly resistant to the erosive effects of the high velocity gases. Furthermore, they must be extremely inert chemically so as not to be corroded by the combustion gases which usually are highly oxidizing in nature. Among the first non-metallic refractory rocket linings used were linings of various refractory porcelains. These materials were tried because they were known to be highly refractory, and inasmuch as they are oxidic in form are highly resistant to oxidation. However, these rocket nozzle linings were highly unsatisfactory, being eroded to a point of uselessness in an extremely short time.

Next, linings made of graphite, which is stable at temperatures up to about 3000° C. were turned to because it was believed that this material would be more resistant to erosion. However, rocket nozzles made of graphite were found to be relatively unsatisfactory, being corroded badly at the throat of the nozzle in a very short time, usually in a matter of a few seconds. This material apparently could not stand up under the highly oxidizing conditions of use. Nevertheless, for many years, graphite was used as the best available refractory material for lining rocket nozzles and the like despite the extremely short firing lives of such rockets.

Rocket nozzles lined with bonded silicon carbide were also used. These rocket nozzles were found to be superior to rocket nozzles lined with porcelains and graphite in respect to ability to withstand the corrosive and erosive effects of the combustion gases. However, even these rocket nozzles have relatively short firing lives, deteriorating at the throat of the nozzle to a substantial degree in a relatively short time.

In the past few years certain super refractory materials have been developed which can be used as rocket nozzle linings to provide rocket nozzles which can withstand extended firing periods. However, satisfactory linings of such materials must be of extremely high density to withstand the corrosive and erosive effects of the high velocity, hot gases of combustion. Consequently, such rocket nozzles, because of the high density of the linings, have the disadvantage of unduly adding to the weight of the rocket device. Furthermore, these super refractory materials usually require very high temperatures of fabrication and often involve the use of strategically critical materials and so are relatively expensive and/or unavailable in large quantities.

It is a nobject of the present invention to provide refractory lined nozzles for the directional release of high velocity, hot gases of combustion which are of light weight and inexpensive construction and are satisfactory for use under the most exacting conditions.

It is a still further object to provide nozzles which are constructed of shapes which can be readily fabricated by conventional ceramic methods.

Other objects and advantages accruing from the invention will become apparent as the description proceeds.

Figure 3:
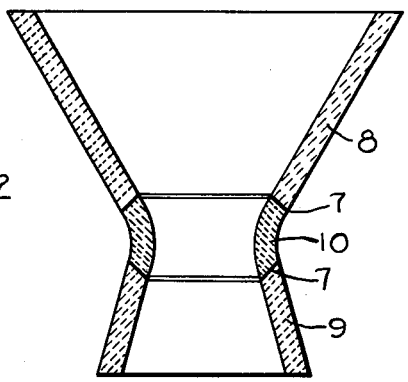
Figure 2:
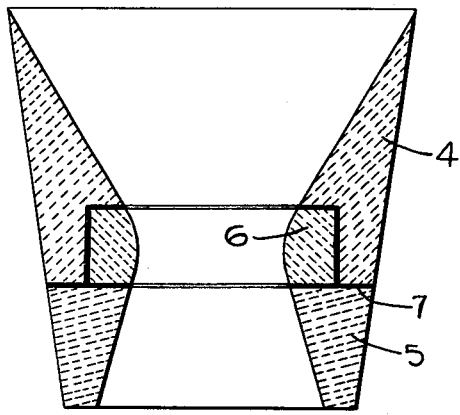

In order that the present invention may be more clearly understood, reference is made to the drawing, the figures of which depict illustrative nozzles, and in which FIGURE 1 is an end elevational view of a representative composite refractory nozzle made in accordance with the present invention;

FIGURE 2 is a longitudinal, diametrical cross-section through the line 2—2 of FIGURE 1; and FIGURE 3 is a sectional view similar to FIGURE 2 showing another modification of the present invention.

In accordance with the present invention, I have found that highly satisfactory refractory nozzles for the directional release of high velocity, hot gases can be made which are outstanding in performance for many extremely severe operational purposes by constructing the nozzle of a composite of different materials whereby the main body or bulk of the nozzle is formed of a bonded refractory composition of granular silicon carbide and a suitable refractory bond therefor, and at least a portion of the orifice walls of the nozzle, and particularly those portions at or adjacent the throat or arch of greatest restriction in the nozzle passageway are composed of a more refractory material than the bonded silicon carbide body composition. For example, a nozzle consisting of ceramic—that is, non-metallic—refractory material from end to end of the nozzle, such as that shown in FIGURES 1 and 2 of the drawing, can be made in which the main body part or parts of the nozzle are composed of silicon carbide bonded by the use therewith of a metal alloy such as ferromanganese-silicon as the bonding ingredient, in accordance with the teachings of U.S. Patent No. 2,364,108, issued December 5, 1944 to John P. Swentzel. The throat of the nozzle is formed of an inlay of bonded zirconium boride or other more refractory ceramic material. According to the invention the composition of the main body or bulk of the nozzle is not restricted to silicon carbide having any one specific bond or bond-type such as that set forth above since other materials can be used as the bond for the granular or powdered silicon carbide as will be more fully disclosed hereinafter. Also, other super refractory materials can be used in place of the zirconium boride, such as molybdenum disilicide, stabilized zirconia, beryllia or thorium oxide, the main requirement being that this material is more refractory than the bonded silicon carbide body composition. The term "more refractory" material as used above means material that is more capable of standing up under the severe corrosive and erosive operating conditions existing at the throat of the nozzle during use, and as used in this sense does not merely mean that the material fuses or dissociates at a higher temperature.

As a modification of the present invention which is satisfactory for some uses, instead of using as the throat inlay or segment a more refractory material such as those set forth above, I can use as the inlay or segment for the throat of the nozzle a heat resistant metal or alloy, as for example, a stainless steel or other metal alloy resistant to corrosion and erosion at high temperatures. One stainless steel satisfactory for such use is that known to the trade as Type 310 stainless steel containing 25% chromium and 20% nickel with the remainder iron. Other metal alloys comparable in resistance to Type 310 stainless steel can also be used.

The walls of the nozzles of the present invention converge, or taper inwardly from at least one end, and usually from both ends, as shown in FIGURES 2 and 3, to form a convergent section where the combustion gas enters the nozzle, a throat or section of greatest restriction, and a divergent or outwardly flared discharge or exit cone at the end of the nozzle from which the combustion gases exit from the nozzle. The half-angle or the discharge cone, which is the angle between the axis of the structure and a line along the inner surface of the discharge cone, is normally between 12° and 18°.

The main body of the nozzle can be molded in one or more separate pieces depending upon the overall size and shape of the nozzle and also the size and shape of the inlay or segment of super refractory material. The inlay or segment of super refractory material can be made to extend the full length of the nozzle passageway and thereby form the entire inner lining wall of the nozzle or, as in the specific nozzle shown in FIGURES 1 and 2 of the drawing, it can form only that portion of the nozzle orifice at and adjoining the throat or section of greatest restriction in the nozzle orifice. Also, the inlay or segment forming the throat of the nozzle can extend in depth only a short distance from the orifice surface into the body of the nozzle as shown for the nozzle of FIGURES 1 and 2 or it can constitute the entire thickness of the nozzle at the throat, as shown for the nozzle of FIGURE 3. The present invention is not intended to be confined to nozzles in which the orifice tapers inwardly from both ends toward the middle of the nozzle but includes nozzles tapering entirely from one end or, as a matter of fact, nozzles having no taper whatever to the orifice.

The following examples are illustrative of the compositions to be used and the manner of making composite refractory nozzles in accordance with the practice and teachings of the present invention using a bonded silicon carbide composition as the main body of the nozzle together with an inlay or segment of super refractory material as at least a part of the inner orifice lining thereof:

*Example I*

Referring to FIGURES 1 and 2 of the drawing which depict a nozzle of the type used in recoilless rifles and which can be satisfactorily made according to the present invention, the main body of the nozzle is formed in two separately molded pieces 4 and 5 from the silicon carbide composition below in the following manner:

| | Parts by weight |
|---|---|
| 14 and finer silicon carbide grain | 93 |
| Powdered silicon carbide | 7 |
| Ferromanganese-silicon powder | 2 |
| Dry lignone | 3 |

The silicon carbide grain is selected in a gradation of grit sizes such as to produce a maximum density in the molded piece. The feromanganese-silicon used is in finely divided form. In mixing the various ingredients the ferromanganese-silicon powder is thoroughly mixed dry with the fine fraction of silicon carbide and the dry temporary binder, after which it is mixed with the coarser fractions of silicon carbide grain in the dry state, followed by mixing wet in an ordinary kneader mixer, sufficient water being added to bring the batch to a pressing consistency. Pieces conforming to body members 4 and 5 are then formed by pressing in a hydraulic press at a pressure in excess of 5,000 pounds per square inch. The molded shapes are then dried in the usual manner at 220° F., placed in a kiln and embedded in a mixture of coke and sand and finally fired to 1415° C. Satisfactory results can be obtained by drying the molded articles at other higher or lower temperatures and the shapes can be fired at anywhere from 1300° to 1450° C.

Inlay 6 is molded from the following composition:

| | Parts by weight |
|---|---|
| 200 and finer grit size zirconium boride | 100 |
| "Carbowax" 4000—temporary binder | 3 |

"Carbowax" 4000 is the trademark name for a polyethylene glycol compound made and sold by Carbide and Carbon Chemicals Corporation of New York, New York.

The above composition is pressed in a hydraulic press at a pressure of around 20,000 pounds per square inch. The molded piece is then dried in the usual manner at 220° F. and finally sintered at 2000° C. for ½ hour in an inert atmosphere.

After the main body pieces 4 and 5 and the inlay 6 have been made as above described the parts are cemented together by refractory cement 7 such as a zirconia-sodium silicate cement, a calcium aluminate hydraulically setting cement, or the like. One castable refractory cement which has been found satisfactory for such use is a calcium aluminate cement such as that sold by the Universal Atlas Cement Company of 100 Park Avenue, New York 17, N.Y., under the trademark name of "Lumnite" cement. A typical analysis of a hydraulically setting calcium aluminate cement is alumina 45%, lime 35%, iron oxide 15% and silica 5%. After the parts have been cemented together and the refractory cement allowed to set by air drying or oven drying at low temperature the resulting nozzle is ready for use.

*Example II*

The main body of a nozzle, such as the body pieces 4 and 5 of the nozzle shown in FIGURES 1 and 2, is made of silicon nitride-bonded silicon carbide, in accordance with principles and practices more fully described in copending U.S. Patent application Serial No. 11,356, filed by John P. Swentzel, as follows:

| | Parts by weight |
|---|---|
| 14 and finer silicon carbide grain | 70 |
| Colloidal silicon carbide | 10 |
| 200 mesh and finer commercial grade silicon powder | 20 |
| Dry lignone | 3 |

The silicon carbide grain is selected in a gradation of grit sizes such as to produce a maximum density in the finished articles. The colloidal silicon carbide, the silicon powder and lignone are first dry-mixed thoroughly, then admixed dry with the balance of the silicon carbide, and finally mixed in an ordinary kneader mixer with sufficient water to bring the mix to a pressure molding consistency. The desired shapes are then formed by pressing in a hydraulic press at 6200 pounds per square inch. The shaped articles are then dried in the usual manner at 220° F. and fired in an atmosphere of nitrogen at 1400° C. for 12 hours, after which they are allowed to cool, and are then ready for assembly with the inlay piece 6.

The inlay piece 6 for the nozzle is formed of stabilized zirconia as follows:

| | Parts by weight |
|---|---|
| Stabilized zirconia with at least 90% having a particle size below 5 microns | 100 |
| Dextrin | 5 |

The stabilized zirconia is zirconium oxide stabilized in cubic crystal form by the addition of a small amount of a stabilizing oxide, e.g. 5% of calcium oxide.

The above ingredients are moistened with sufficient water to render the mix of pressing consistency and molded in a hydraulic press at 10,000 to 20,000 pounds per square inch. The shaped piece is then dried in the usual manner at 220° F. and the dried shape fired in an oxidizing atmosphere at 1450° C. for 4–5 hours.

The parts of the nozzle are assembled in the same manner as described in Example I, using a calcium aluminate refractory cement or a zirconia-sodium silicate refractory cement as the binder for cementing the various parts together.

*Example III*

A nozzle, such as that shown in FIGURE 3 can be made using the compositions of Example I or II and following the procedures therein set forth. The main body of the nozzle is made up of pieces 8 and 9 which are molded of the silicon carbide refractory composition, whereas the throat segment 10, which forms the entire wall thickness of the nozzle at the throat is composed of stabilized zirconia, or bonded zirconium boride, or other comparable super refractory material. The main body parts 8 and 9 and the throat segment 10 are cemented together by a refractory cement such as a zirconia-sodium silicate cement.

While I have set forth silicon carbide bonded by a metal alloy such as ferromanganese-silicon and silicon nitride-bonded silicon carbide as specific bonded silicon carbide compositions suitable as the main body of the nozzle, and highly satisfactory results have been obtained by the use of such bonded silicon carbide materials, it is not intended to restrict the scope of the present invention to the use of such specifically mentioned compositions as the bond for the silicon carbide which constitutes the main body or bulk of the nozzle. Other proportions of silicon or ferromanganese-silicon to silicon carbide, all as within the teachings of the aforementioned Swentzel patent, which discloses bodies comprising 50% or more silicon carbide, and the aforementioned Swentzel application, which discloses bodies comprising 38% or more silicon carbide, can be similarly used. Also, silicon carbide bodies which are otherwise bonded can be used, such as silicon carbide bonded by various vitreous or ceramic bonding materials, or silicon carbide bonded by other compatible carbides or the like such as boron carbide, or even silicon carbide which has been self-bonded by a recrystallization process wherein the molded shape of granular and/or powdered silicon carbide together with a small amount of temporary binder is fired at a temperature in excess of 2200° C. to recrystallize the silicon carbide and form a self-bonded body.

Also, where reference is made in the specification or the claims to a super refractory material or a material of greater or higher refractoriness as the material for the inlay or segment at the throat of the nozzle, it is intended to cover not only those ceramic materials herein set forth for that use and including bodies of zirconium boride, stabilized zirconia, molybdenum disilicide, beryllia and thorium oxide, and the like, but to also cover those heat- and corrosion-resistant metals and alloys, such as stainless steel and the like, which are suitable for such use.

Obviously, nozzles of various shapes other than that shown in FIGURES 1, 2 and 3 of the drawing can be made without departing from the spirit of the present invention. Likewise, the main body can be made of one or more pieces for the purpose of facilitating the molding of the article, depending upon the size and shape of the nozzle which it is desired to make, and the form of the inlay or segment for the throat.

Having described the invention in detail it is desired to claim:

1. A nozzle of composite structure for the directional release of high velocity, hot gases of combustion having a convergent section, a throat, and a divergent exit cone, said nozzle consisting of ceramic refractory material from end to end and comprising a main body of bonded silicon carbide containing at least 38% silicon carbide and a throat inlay of substantial thickness at all points composed of refractory material selected from the group consisting of zirconium boride, molybdenum disilicide, beryllia, thoria and stabilized zirconia.

2. A nozzle of composite structure for the directional release of high velocity, hot gases of combustion having a convergent section, a throat, and a divergent exit cone, said nozzle consisting of ceramic refractory material from end to end and comprising a main body of bonded silicon carbide, and an inlay of relatively small volume embedded in the throat of said nozzle at the most restricted part thereof, said inlay being composed of a material of greater refractoriness than the main body of said nozzle and being selected from the group consisting of zirconium boride, molybdenum disilicide, beryllia, thoria and stabilized zirconia.

3. A nozzle according to claim 2 in which the throat lining component is zirconium boride.

4. A nozzle according to claim 2 in which the throat lining component is molybdenum disilicide.

5. A nozzle according to claim 2 in which the throat lining component is beryllia.

6. A nozzle according to claim 2 in which the throat lining component is thoria.

7. A nozzle according to claim 2 in which the throat lining component is stabilized zirconia.

8. A nozzle of composite structure for the directional release of high velocity, hot gases of combustion having a convergent section, a throat section of greatest restriction, and a divergent exit cone, said exit cone having a half-angle of from 12° to 18°, said nozzle consisting of ceramic refractory material from end to end and comprising a main body of silicon-nitride bonded silicon carbide and a body of a refractory material selected from the group consisting of zirconium boride, molybdenum disilicide, beryllia, thoria and stabilized zirconia.

References Cited in the file of this patent

UNITED STATES PATENTS

| 866,444 | Egly | Sept. 17, 1907 |
|---|---|---|
| 1,611,353 | Lepinte | Dec. 21, 1926 |
| 1,635,839 | Hassall et al. | July 12, 1927 |
| 1,832,873 | Milner | Nov. 24, 1931 |
| 2,268,279 | Debenham et al. | Dec. 30, 1941 |
| 2,364,108 | Swentzel | Dec. 5, 1944 |
| 2,433,932 | Stosick | Jan. 6, 1948 |
| 2,458,285 | Meyer | July 4, 1949 |
| 2,502,947 | Hess | Apr. 4, 1950 |
| 2,614,619 | Fuller | Oct. 21, 1952 |
| 2,658,332 | Nicholson | Nov. 10, 1953 |
| 2,699,036 | Nicholson | Jan. 11, 1955 |

FOREIGN PATENTS

| 467,877 | Great Britain | June 24, 1937 |
|---|---|---|
| 578,007 | Great Britain | June 12, 1946 |